June 17, 1969  L. F. WILHAM  3,449,774
ATTACHMENT DEVICE FOR TOILET SEAT HINGE
Filed Feb. 1, 1967
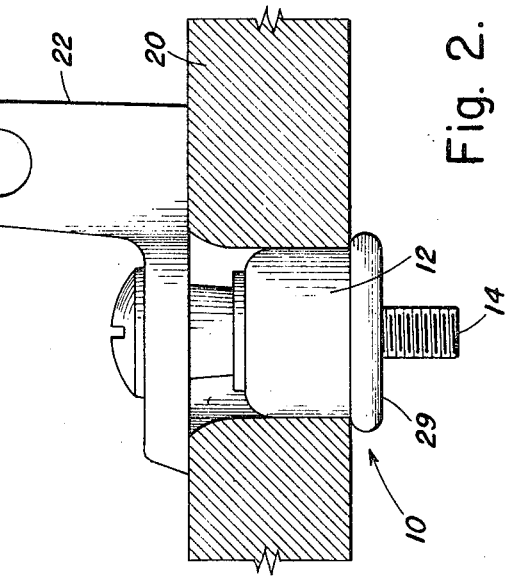
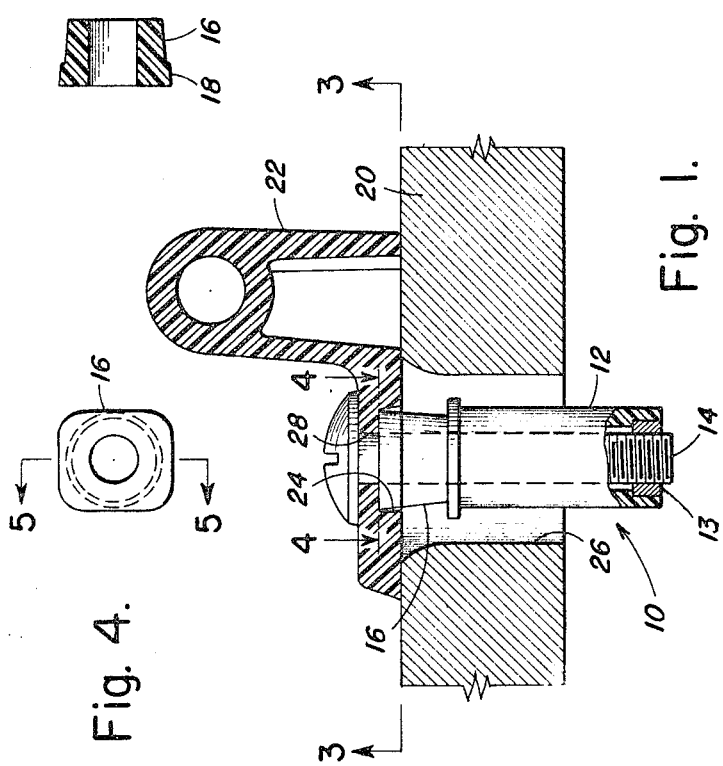
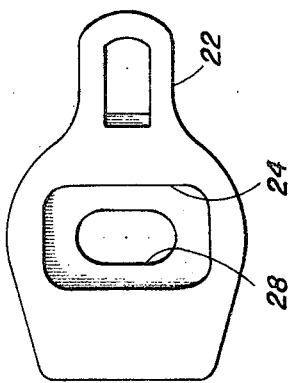
INVENTOR
Larry F. Wilham
BY *Sheldon H. Parker*
ATTORNEY

United States Patent Office 3,449,774
Patented June 17, 1969

3,449,774
ATTACHMENT DEVICE FOR TOILET SEAT HINGE
Larry F. Wilham, Louisville, Ky., assignor to American Standard Inc., New York, N.Y., a corporation of Delaware
Filed Feb. 1, 1967, Ser. No. 613,354
Int. Cl. A47k *13/12;* F16b *13/06, 33/04*
U.S. Cl. 4—240                                  11 Claims

ABSTRACT OF THE DISCLOSURE

An anchoring device which is particularly suitable for securing toilet seats to toilets. The anchoring device includes four essential elements, a screw, a spacer, a resilent sleeve and a nut fixed in place inside the sleeve at its lower end. In use the screw passes through a hole in the toilet seat hinge, through the spacer and then through the sleeve until it engages the nut. The sleeve is placed in position in a hole in the toilet and the screw is turned until the sleeve is axially compressed and radially expanded to the desired extent.

---

The present invention relates to anchoring devices for use in fixing articles to walls or the like and more particularly to a device for anchoring articles such as a toilet seat to china or porcelain surfaces such as a water closet.

The need for a simple means of securing a toilet seat to the water closet has long been recognized. Nevertheless, the use of a nut and bolt has persisted for many years in spite of the fact that applying enough of a twisting force to the nut by means of a pair of pliers or a wrench, to firmly lock the seat in place is made difficult by the inherent design of the water closet which prevents rotation of the tool. In some cases, the problem is particularly acute, because the nut must be located within the water chamber of the water closet, thereby making access almost impossible.

The object of the invention is to provide an improved anchoring device for these purposes which shall be simple to use, highly effective in operation, and shall have certain other advantages.

The invention consists of an anchoring device for use in fixing a toilet seat to a structural member such as a water closet or the like comprising a deformable sleeve having an interior passage therethrough and having a diameter no greater than the diameter of the hole in the water closet or the like to which it is to be secured and being deformable by axial compression to an external diameter greater than that of the fixing hole; a threaded member in fixed engagement with said sleeve and positioned at one end of said sleeve, a threaded screw element engageable with and adapted to pass through the interior passage of the sleeve, and a spacer member positioned adjacent the other end of the sleeve and situated between the sleeve and the head of the screw element. The spacer is further provided with an interior passage therethrough which is adapted to functionally permit passage therethrough of the screw member. The arrangement being such that the tightening of the threaded fixing member after the sleeve and spacer have been inserted into the hole will cause axial compression of the sleeve and spacer with consequent radial expansion of the sleeve. The sleeve thereby firmly engages the bottom surface of the spacer, causing the spacer to be compressed against the hinge of the toilet seat, and firmly engage the interior surface of the fixing hole.

The deformable sleeve is preferably made from an elastic material such as hard rubber, while the spacer is conveniently of thermoplastic polymeric material such as polyethylene. The nut element can be of a hard material, e.g., metal or vulcanized fiber, either formed initially with an internal screw thread, suited to the thread of the cooperating bolt or screw, or such that the bolt or screw may cut its own thread therein. With advantage, the nut element can be secured on or in the sleeve, as by being bonded or vulcanized thereto, but it can also have projections or recesses which are adapted to engage the sleeve under axial pressure and prevent relative rotation of the two parts. In some cases the sleeve is formed with an outwardly extending flange on one end adjacent the spacer member.

The nature of the invention will be clearly understood from the following specification and by reference to the accompanying drawings, wherein examples of the invention are shown, and wherein:

FIG. 1 is a fragmentary elevational view, partly in section of an anchoring device embodying the present invention installed in a fragmentarily shown water closet wall;

FIG. 2 is a similar view of the device of FIG. 1 illustrating the sleeve and spacer in their compressed and deformed state;

FIG. 3 is a bottom view of a portion of a toilet seat hinge;

FIG. 4 is a plan view of a spacer, taken along lines 4—4 of FIG. 1; and

FIG. 5 is an elevational view, in section, of the spacer of FIG. 4 taken along lines 5—5 of FIG. 4.

Referring now to the drawings, there is shown in FIG. 1 an anchoring device 10 having a deformable tubular sleeve 12, a threaded screw 14 engageable with a threaded nut member in the bottom of the sleeve. A spacer member 16 having an outwardly extending flange 18 is positioned on top of the sleeve 12. The sleeve 12 has a length at least equal to the thickness of the wall of the water closet 20. Further shown in FIG. 1 is a toilet seat hinge 22 having a concavity of 24 adapted to receive the flange 18 of the spacer 16.

In use, the sleeve 12 and spacer 16 are positioned in a selected surface or body, such as the water closet wall 20, by drilling or pre-molding therein an opening 26 of sufficient diameter as to receive the sleeve 12 and spacer 16. Upon reaching the position shown in FIG. 1, the toilet seat hinge 22 is put in place as shown and the threaded screw 14 is inserted through the hole 28 in the hinge 22 and then through the spacer 16 and sleeve 12. Thereupon, the screw 14 is rotated in a clock-wise direction causing it to come into threaded engagement with the nut and then causing axial compression and radial expansion of the sleeve 12. The sleeve 12 is thus forced against the spacer 16 and the flange 18 of the spacer 16 is firmly forced into the concavity 24 of the hinge 22.

At least the upper portion of the spacer 16 is rectangular in configuration and is dimensioned such that it cannot rotate within groove 24 of hinge 22, but can be shifted laterally. This permits the toilet seat to be manufactured with a particular spacing between hinges 22 and yet be useable with toilets with holes 26 which have a somewhat greater or lesser spacing. The spacer can conveniently be a square having about one half inch sides while the recess of the groove is about 0.52 of an inch by almost an inch. A two hundredth of an inch space between the walls of the recess and the space provide a desirable sliding fit between the spacer and the hinge.

As shown in FIG. 2, the sleeve expands radially until it is firmly wedged against the walls of the hole 26. If the combined length of the spacer 16 and the compressed length of sleeve 12, is greater than the length of hole 26, the sleeve will swell outwardly and form a flange like region 29. Although the pressure between the hole 26 and the sleeve 12 is normally sufficient to adequately anchor the toilet seat in place, the swell 29 is desirable because it further prevents the sleeve from being forced upwardly through the hole 26.

The use of the spacer 16, is particularly critical when the anchoring device is to be used with water closets. As seen in FIGS. 1 and 2, hole 26 enlarges slightly at its upper end and the inner walls of the hole 26 develops a glazed surface similar to that of the other surfaces of the china toilet.

The use of the anchoring device without the spacer 16 does not work because the sleeve tends to expand along the path of least resistance. The sleeve expands until it fills the hole and then extrudes out the top of the hole. The outwardly flowing smooth walled upper region appears to guide the material smoothly out of the hole until the sleeve is completely out of the hole. The foregoing is true even in cases where the sleeve extends well below the lower surface of the wall 20.

The holes in water closets typically vary from about three-eighths of an inch in diameter to three-quarters of an inch in diameter, while the wall thickness in the region of the hole varies in water closets, from about three eighths of an inch to over five eighths of an inch. The anchoring device described herein is suited for use in any combination of these hole diameters and wall thicknesses.

It will be obvious that although the invention has been described in comparatively general terms, it is of particular significance in regard to fasteners or anchoring devices of relatively small diameter. In these applications the fasteners typically have an effective diameter of the magnitude of from about five eighths to about three eights of an inch and primarily about a half inch diameter. The length can vary from about one-half inch to about an inch and one-half. The spacer preferably has a length of from about one-quarter of an inch to about one-half of an inch. Thus if groove 24 has a depth of about one-tenth of an inch the spacer will project into the hole 26, about one-tenth of an inch less than its length. Preferably the spacer is about one third of an inch long and projects one-quarter of an inch into the hole. The ease of use and installation and surprising security of mounting and fastening become most readily apparent in this particular area of usage.

Although only anchors or fastening members of circular cross section are illustrated in the drawings, it is manifest that various cross-sectional shapes may be employed such as square, elliptical, rectangular, and the like, to fit in openings of corresponding shapes.

The foregoing description of the invention is explanatory thereof and various changes in the size, shape and materials, as well as in the details of the illustrated construction may be made, without departing from the spirit of the invention.

What is claimed is:

1. In the combination of a water closet having a pair of spaced holes and a toilet seat having a pair of hinges spaced apart a distance corresponding substantially to the distance between said spaced holes and anchoring means in said holes and connected to said hinges for rigidly securing said toilet seat to said water closet, the improvement wherein said anchoring means comprises:
    (a) a deformable sleeve member, said sleeve member having an interior passage therethrough;
    (b) an intriorly threaded nut element, said element being fixed in position at one end of said sleeve member and being coaxial with said interior passage;
    (c) a spacer means, said means being adjacent the other end of said sleeve and having an interior passage coaxial with the interior passage of said sleeve member;
    (d) a threaded screw member, said screw member being positioned such that, it passes through said spacer and said sleeve and is in threaded engagement with said nut element; and
wherein said hinge has a rectangular recessed portion in its lower surface and at least the upper portion of said spacer has a rectangular configuration, two opposite sides of said rectangular portion of said spacer having a length almost as long as two opposite sides of said rectangular recess, whereby said spacer is in sliding engagement with said recess.

2. The combination of claim 1, wherein said sleeve has an overall length of from about one-half inch to about one and one-half inch and a diameter of from about three eighths of an inch to about five eighths of an inch and said spacer has a length of from about one-quarter of an inch to about one-half of an inch.

3. The combination of a water closet having a pair of spaced holes, and a toilet seat having a pair of hinged assemblies spaced apart a distance corresponding substantially to the distance between said spaced holes, the improvement wherein each of said hinge assemblies comprises:
    (a) deformable sleeve member, said sleeve member having an interior passage therethrough;
    (b) rigid element, said element being fixed in position at one end of said sleeve member;
    (c) spacer means, said means being adjacent the other end of said sleeve and having an interior passage coaxial with said interior passage of said sleeve member:
    (d) hinge member
        having a first portion, and a second portion said first portion having a passage therethrough coaxial with said interior passage of said spacer means, said spacer means being rotationally fixed with respect to said first portion of said hinge member;
        said second portion extending from said first portion and having means at one end for hinged connection to said toilet seat; (and)
    (e) compression means, for applying a compressive force on said deformable sleeve between said rigid member and said spacer means, said compression means including an elongated member, positioned such that it passes through the passages in said first portion of said hinge member, said spacer means and said sleeve member and in engagement with said rigid element;
wherein each of said sleeve members and said spacer means are positioned in one of said spaced holes in said water closet, in order to fix said toilet seat to said water closet.

4. The structure of claim 3, wherein:
    said spacer means has a first surface and a second surface and said interior passage extends from said first surface to said second surface, said first surface being in contact with said deformable sleeve member and said second surface being in contact with one side of said first portion of said hinge member, said second surface having a rectangular configuration; and
    said one side of said first portion of said hinge member has a rectangular recessed portion, two opposite sides of the rectangular portion of said spacer means being almost as long as two opposite sides of said rectangular recess, and the other sides of said rectangular portion of said spacer means being substantially less than the other sides of said rectangular recess, whereby said spacer is in sliding engagement with said recess.

5. The structure of claim 3 wherein said spacer means projects from about .15 of an inch to about .4 of an inch into the hole in said water closet.

6. The structure of claim 3 wherein said spacer means and said sleeve member are cylindrical in shape are concentrically positioned within said spaced holes.

7. The structure of claim 3 wherein said spacer means is frictionally engaged with the other end of said sleeve member to prevent the sleeve member from rotational movement.

8. A toilet seat hinge assembly for use in fixing a toilet seat to a structural member such as a water closet or the like comprising:
(a) deformable sleeve member, said sleeve member having an interior passage therethrough;
(b) rigid element, said element being fixed in position at one end of said sleeve member;
(c) spacer means, said means being adjacent the other end of said sleeve and having an interior passage coaxial with said interior passage of said sleeve member;
(d) hinge member
having a first portion, and a second portion said first portion having a passage therethrough coaxial with said interior passage of said spacer means and said means being rotationally fixed with respect to said first portion of said hinge member;
said second portion extending from said first portion and having means at one end for hinged connection to said toilet seat; and
(e) compression means, for applying a compressive force on said deformable sleeve between said rigid member and said spacer means, said compression means including an elongated member, positioned such that it passes through the passages in said first portion of said hinge member, said spacer means and said sleeve member and in engagement with said rigid element.

9. The anchoring device of claim 8, wherein said sleeve has an overall length of from about one-half inch to about one and one-half inch.

10. The anchoring device of claim 8, wherein said sleeve has a diameter of from about three-eighths of an inch to about five-eighths of an inch.

11. The anchoring device of claim 8, wherein said spacer has a length of from about one-quarter of an inch to about one-half of an inch.

References Cited

UNITED STATES PATENTS

| 1,038,834 | 9/1912 | Bloom | 4—240 |
| 2,365,372 | 12/1944 | Allen | 85—70 |
| 2,525,736 | 10/1950 | Taylor | 85—70 |
| 3,080,572 | 3/1963 | Miller et al. | 4—240 |
| 3,301,121 | 1/1967 | Newcomer | 85—70 |

FOREIGN PATENTS

| 877,878 | 9/1942 | France. |
| 990,103 | 5/1951 | France. |
| 1,312,011 | 11/1962 | France. |

MARION PARSONS, Jr., *Primary Examiner.*

U.S. Cl. X.R.

85—70